(12) United States Patent
Walker et al.

(10) Patent No.: US 12,332,189 B2
(45) Date of Patent: Jun. 17, 2025

(54) X-RAY INSPECTION SYSTEM, AN X-RAY IMAGING ACCESSORY, A SAMPLE SUPPORT, A KIT, AND A METHOD OF USING AN X-RAY INSPECTION SYSTEM

(71) Applicant: NORDSON CORPORATION, Westlake, OH (US)

(72) Inventors: Bill Walker, Suffolk (GB); David Sutton, Essex (GB)

(73) Assignee: Nordson Corporation, Westlake, OH (US)

( * ) Notice: Subject to any disclaimer, the term of this patent is extended or adjusted under 35 U.S.C. 154(b) by 96 days.

(21) Appl. No.: 18/000,594

(22) PCT Filed: Jun. 8, 2021

(86) PCT No.: PCT/US2021/036343
§ 371 (c)(1),
(2) Date: Dec. 2, 2022

(87) PCT Pub. No.: WO2021/252451
PCT Pub. Date: Dec. 16, 2021

(65) Prior Publication Data
US 2023/0304946 A1    Sep. 28, 2023

(30) Foreign Application Priority Data
Jun. 9, 2020   (GB) .................................... 2008738

(51) Int. Cl.
*G01N 23/04* (2018.01)
*G01N 23/046* (2018.01)
*G01N 23/083* (2018.01)

(52) U.S. Cl.
CPC ......... *G01N 23/046* (2013.01); *G01N 23/083* (2013.01); *G01N 2223/309* (2013.01);
(Continued)

(58) Field of Classification Search
CPC .............. G01N 23/046; G01N 23/083; G01N 2223/309
See application file for complete search history.

(56) References Cited

U.S. PATENT DOCUMENTS 10,468,230 B2 * 11/2019 Lavely .................. H01J 37/256
2014/0064445 A1 * 3/2014 Adler .................. G01N 23/083
378/43
(Continued)

FOREIGN PATENT DOCUMENTS

CN    104849295 A    8/2015
CN    106164656 A    11/2016
(Continued)

OTHER PUBLICATIONS

GB Search report Mailed on Nov. 18, 2020 for GB Application No. 2008738.
(Continued)

*Primary Examiner* — Hugh Maupin
(74) *Attorney, Agent, or Firm* — BakerHostetler

(57) ABSTRACT

An x-ray inspection system comprising an x-ray source, an x-ray detector, a sample support comprising a pliable material and a sample support positioning assembly configured to position the sample support between the x-ray source and the x-ray detector. The sample support is configured to removably clamp a sample for inspection in a fixed position with respect to the sample support and configured so that, in use, at least one surface of the sample is in contact with the pliable material. The sample support positioning assembly comprises a rotational drive configured to rotate the sample support about a rotational axis. This allows the sample to be rotated about a rotational axis such that a series of two- (Continued)

dimensional images can be captured by the x-ray detector that can be used to create a three-dimensional reconstruction of the sample.

20 Claims, 9 Drawing Sheets

(52) U.S. Cl.
CPC ............... *G01N 2223/313* (2013.01); *G01N 2223/3306* (2013.01)

(56) References Cited

U.S. PATENT DOCUMENTS

| | | | |
|---|---|---|---|
| 2015/0234060 A1 | 8/2015 | Rinsema et al. | |
| 2015/0300963 A1* | 10/2015 | Haidekker | G06T 11/008 382/131 |
| 2016/0040976 A1* | 2/2016 | Berkeley | A61B 3/102 356/479 |
| 2017/0011973 A1 | 1/2017 | Tingay et al. | |
| 2017/0023495 A1 | 1/2017 | Santillan et al. | |
| 2018/0024081 A1 | 1/2018 | Kogan et al. | |
| 2019/0154595 A1* | 5/2019 | Rempel | A61B 6/4417 |
| 2019/0167238 A1* | 6/2019 | Keller | A61B 10/0275 |
| 2020/0303265 A1* | 9/2020 | Gellineau | H01L 22/20 |

FOREIGN PATENT DOCUMENTS

| | | |
|---|---|---|
| CN | 106170226 A | 11/2016 |
| CN | 106461577 A | 2/2017 |
| DE | 102009018570 A1 | 10/2010 |
| DE | 202014003439 U1 | 7/2014 |
| EP | 3273229 A1 | 1/2018 |
| JP | 04-122356 U | 11/1992 |
| JP | 2004-121291 A | 4/2004 |

OTHER PUBLICATIONS

IPEA/409—International Preliminary Report on Patentability Mailed on Dec. 22, 2022 for WO Application No. PCT/US21/036343.
ISA/220—Notification of Transmittal or Search Report and Written Opinion of the ISA, or the Declaration Mailed on Oct. 18, 2021 for WO Application No. PCT/US21/036343.

* cited by examiner

X-RAY INSPECTION SYSTEM, AN X-RAY IMAGING ACCESSORY, A SAMPLE SUPPORT, A KIT, AND A METHOD OF USING AN X-RAY INSPECTION SYSTEM

CROSS REFERENCE TO RELATED APPLICATIONS

This application is a National Phase Application of International Patent Application No. PCT/US2021/036343, filed Jun. 8, 2021, which claims priority to United Kingdom Patent Application No. 2008738.3 filed Jun. 9, 2020, the entire disclosures of both of which are hereby incorporated by reference as if set forth in their entirety herein.

FIELD OF THE INVENTION

The invention relates to an x-ray inspection system, an x-ray imaging accessory for an x-ray inspection system, a sample support for an x-ray inspection system, a kit for an x-ray inspection system and a method of using an x-ray inspection system.

BACKGROUND TO THE INVENTION

X-ray inspection systems can be used to inspect samples. By placing a sample between an x-ray source such as an x-ray tube and an x-ray detector, a two-dimensional image of a section through the sample can be captured. The image provides detailed information about the internal structure of the sample. One industry in which x-ray inspection is particularly useful is in the manufacture of electronic components, including packaged semiconductor devices. It is useful to be able to inspect electronic components for voids, cracks and misalignments in deposited conductive elements.

Some x-ray inspection systems can be used to perform computed tomography. In computed tomography, a series of two-dimensional images of sections through the sample are captured and the sample is rotated with respect to the x-ray source and x-ray detector, or vice versa, between images. A three-dimensional reconstruction of the sample can then be computed by combining the two-dimensional images. The three-dimensional reconstruction of the sample allows for three-dimensional analysis of the internal structure of the sample, virtual micro-sectioning and internal dimensional measurements, for example. It may also reduce the need for time-consuming micro-section analyses of the sample and additionally or alternatively assist in identifying where micro-section preparation and investigation should be concentrated.

In x-ray inspection systems where the sample is rotated with respect to the x-ray source and x-ray detector, the x-ray inspection system may comprise a rotation stage comprising a rotational drive for rotating the sample about a rotational axis. In order for the three-dimensional visualizations to be as accurate as possible, it is desirable that the sample moves only about the rotational axis. For example, it is desirable that the sample does not move with respect to the rotational axis under the action of gravity when the sample is rotated to different positions.

Currently, undesirable movement of the sample is reduced by securing one end of the sample to the rotational drive, for example, using a hot glue gun or a clamp. However, securing the sample in this way can be laborious and time-consuming. For example, for accurate three-dimensional visualizations, it is desirable that the axis of rotation passes through the centre of the sample. Correctly positioning the sample in the x-ray inspection system can be difficult.

Furthermore replacing a first sample with a second sample for inspection can be slow and laborious, particularly if the first sample has been secured using a hot glue gun. There is also a risk that the sample may be damaged by the glue of the hot glue gun or by the clamp. Furthermore, in current methods, samples must be inspected one at a time. If multiple samples are to be inspected, a technician must be on hand to change samples after each sample has been inspected.

Another disadvantage of securing one end of the sample to the rotational drive is that larger and heavier samples may experience some movement of the free end with respect to the secured end as the sample is rotated, for example because of bending of the sample. This bending reduces the accuracy of the three-dimensional visualization created by the computer along the length of the sample.

When inspecting samples such as electronic components, maximising the magnification of the two-dimensional images captured by the x-ray detector may be desirable, particularly when inspecting electronic components. Magnification can be maximised by positioning the sample as close as possible to the x-ray source. However, each sample for inspection may be different in size and shape. Samples may have an irregular shape. In order to avoid collisions between the sample and the x-ray source or some other component of the x-ray system while the sample is being rotated, a user must ensure that the x-ray inspection system is set up correctly for each sample. This increases the complexity of using the x-ray inspection system.

It would be desirable to provide an x-ray inspection system that is simple and fast to use, that allows for high quality and accurate three-dimensional reconstructions to be created even when the sample is large or heavy, that reduces the risk of collisions between the sample and the x-ray inspection system while allowing for high magnification and that allows multiple samples to be inspected simultaneously or in one operation.

SUMMARY OF THE INVENTION

The invention provides an x-ray inspection system, a sample support assembly for an x-ray inspection system, a sample support assembly for an x-ray inspection system, a kit, and a method of using an x-ray inspection system according to the appended independent claims, to which reference should be made. Preferred or advantageous features of the invention are defined in the dependent claims.

In a first aspect there is provided an x-ray inspection system comprising an x-ray source, an x-ray detector, a sample support comprising a pliable material and a sample support positioning assembly. The sample support positioning assembly is configured to position the sample support between the x-ray source and the x-ray detector. The sample support is configured to removably clamp a sample for inspection in a fixed position with respect to the sample support and configured so that, in use, at least one surface of the sample is in contact with the pliable material.

In use, a two-dimensional image of a sample clamped by the sample support and contacted by the pliable material may be captured by the x-ray detector of the x-ray inspection system. Preferably, a series of two-dimensional images may be captured by the x-ray detector, each with the sample at a different angle of rotation about an axis. This may be achieved by rotating the sample support about the axis. In this way, the sample clamped by the sample support is also rotated about the axis. The axis advantageously extends in a direction orthogonal to a straight line extending between the x-ray source and the x-ray detector. The series of two-dimensional images may be used to create a three-dimensional reconstruction of the sample. A clamped sample may advantageously be held in a fixed position within the sample support when the sample support is rotated. Movement of the sample with respect to the sample support may thus be prevented. This may advantageously allow for the creation of an accurate three-dimensional reconstruction of the sample. The sample being removably clamped may advantageously ensure that samples can easily be removed and replaced from the sample support.

The pliable material may be a material that deforms without breaking. The pliable material advantageously is significantly more pliable than the sample or samples to be inspected, and so may conform to the shape of the at least one surface of the sample it contacts. Thus, the sample support may advantageously be able to accommodate a range of sizes and shapes of sample and, in each case, the pliable material may contact at least a surface of the sample. The sample may be secured within the sample support as a result of the contact between the pliable material and the sample. In a preferred embodiment, the sample may be surrounded by the pliable material in use such that all sides of the sample are contacted by, and supported by, the pliable material. Alternatively, the sample may be in contact with a more rigid material on one side and in contact with the pliable material on an opposite side so that the sample is clamped between the pliable material and the more rigid material.

The sample support may be configured to clamp a plurality of samples for inspection simultaneously. The sample support may clamp each of the plurality of samples such that the samples are spaced along the rotational axis. This may advantageously allow multiple samples to be inspected using the x-ray inspection system without the need to mount a new sample between imaging operations. This simplifies operation of the x-ray inspection system and may allow for the automation of the inspection of multiple samples.

The pliable material may be a resilient material. A resilient material will advantageously return to its original shape after a sample has been removed from the sample support. The pliable material may be a compressible foam. The compressible foam may be resilient. The compressible foam may have a low density and advantageously have a low x-ray attenuation coefficient. A compressible foam having a low x-ray attenuation coefficient may comprise materials having a low atomic number or low density, or both.

The sample support may be configured to completely surround the sample in use. X-rays generated by the x-ray source that pass through the sample may be attenuated by the sample support, even if only by a small amount. By providing a sample support that completely surrounds the sample in use, the sample support may attenuate x-rays to a similar extent irrespective of the orientation of the sample support with respect the x-ray source. This may be advantageous for creating high quality and accurate three-dimensional visualizations of the sample, without the creation of imaging artefacts unrelated to the sample.

The magnification of images captured by the x-ray detector may be dependent on the distance between the x-ray source and the sample. In particular, the magnification may increase the closer the sample is to the x-ray source. When a sample is completely surrounded by the sample support, the sample support may be positioned in close proximity to the x-ray source in a position where the sample support is known not to collide with the features of the x-ray inspection system. Therefore, a sample of any shape or size that can be completely surrounded by the sample support may be reliably positioned in a high magnification position without the need to calibrate the x-ray inspection system and without risk of the sample colliding with x-ray source or any other component of the x-ray inspection system. This may advantageously simplify user operation of the x-ray inspection system and, in particular, loading the sample into the x-ray inspection system. The ability to capture high magnification x-ray images may be particularly advantageous when inspecting electronic components, including packaged semiconductor devices.

The sample support may comprise an outer shell comprising a material having a greater rigidity than the pliable material. The outer shell may advantageously provide dimensional stability to the sample support, and reduce bending or deformation of an outer surface of the sample support. The outer shell may also retain the pliable material, thereby providing a clamping force on the sample or samples held within the sample support. The sample support may be connected to the sample support positioning assembly at two ends. The provision of the outer shell may prevent or reduce the sample support from bending in a region between the two ends. The outer shell may completely surround the pliable material. In use, a sample clamped by the pliable material may be entirely received within the outer shell.

The outer shell may comprise at least one of carbon fibres or aramid fibres. Alternatively, or in addition, the outer shell may comprise polyether ether ketone (PEEK). Alternatively, the outer shell may comprise a low-density metal such as aluminium. An outer shell comprising carbon fibres, aramid fibres, PEEK or low-density metal may advantageously have a high rigidity while also having a low density and low x-ray radiation attenuation. Such materials may advantageously be resistant to degradation by x-ray beams passing through the outer shell.

The sample support may have a longitudinal axis and the outer shell may define a shape having a cross-section extending along the longitudinal axis. Preferably, the cross-section of the outer shell is substantially circular such that x-rays passing through sample support pass through substantially the same depth of the same materials of the sample support irrespective of the angle of rotation of the sample support. A sample support having a circular cross-section may have a cylindrical shape. The sample support may have a diameter of between 15 millimetres and 130 millimetres.

When the outer shell is not substantially circular, the cross-section may preferably have an order of rotational symmetry high enough that each two-dimensional image used to form the three-dimensional reconstruction can be taken through line of symmetry of the sample support. The cross-section may have an order of rotational symmetry of at least 16, 32, 64, 128, 256, 512 or 720.

The outer shell may define an interior space. The interior space may be filled with the pliable material. In this context, "filled" means that the pliable material within the outer shell must be compressed within the outer shell in order to accommodate a sample or samples, the sample or samples having a volume within a range of expected sample volumes. Advantageously, the pliable material applies a sufficient clamping force on the sample when compressed between the sample and the outer shell to retain the sample in a fixed position relative to the outer shell as the sample support is rotated about the axis.

The sample support may comprise a first portion and a second portion. The first portion may be moveable relative to the second portion between an open position and a closed position. In the open position the sample support may be able to receive a sample. In the closed position the sample support may clamp a sample received in the sample support between the first portion and the second portion of the sample support.

The first portion may comprise a first portion of pliable material. The second portion may comprise a second portion of pliable material. The pliable material in the second portion is advantageously the same as the pliable material in the first portion, or at least has substantially the same x-ray attenuation coefficient. When a sample is received in the closed sample support, the first and second portions of the pliable material may each contact at least one surface of the sample and conform to the shape of the at least one surface such that the sample is supported by the pliable material and secured in position with respect to the sample support.

The first portion of the sample support may be separable from the second portion of the sample support. Alternatively, the first portion of the sample support may be connected to the second portion of the sample support by a hinge. The first portion of the sample support may be moveable relative to the second portion of the sample support via the hinge. The hinge may comprise a flexible resin or a flexible adhesive tape secured to the first and second portion of the sample support. Alternatively, the hinge may comprise a strip or strips of Mylar, each strip or strips of Mylar secured to the first and second portion of the sample support, for example using an adhesive tape. Alternatively, the first portion of the sample support may be slidable relative to the second portion of the sample support.

The sample support may comprise a means to retain the first portion and the second portion in the closed position. This may advantageously ensure that the sample support remains in the closed position in any orientation.

The means to retain the first portion and the second portion in the closed position may comprise an adhesive tape configured to be removably secured to the first and second portion of the sample support. Alternatively, the first portion of the sample support may engage with second portion of the sample support in the closed position. Alternatively, the means to retain the first and second portion of the sample support in the closed position may comprise a clip configured to engage both the first and second portion of the sample support when the sample support is in the closed position. The sample support may comprise more than one clip configured to engage both the first and second portion of the sample support. The clip may releasably engage or clip onto the sample support. The clip may be removable from the sample support to allow the sample support to be moved from the closed position to the open position. The clip may be slidable along the sample support. The clip may be slidable from a first position in which the clip engages both the first and second portions of the sample support to a second position in which the clip engages only the first portion or second portion of the sample support. The clip may be in the first position when the sample support is in the closed position. A user may slide the clip to the second position to allow the sample support to be moved from the closed position to the open position.

A means to retain the first portion and the second portion in the closed position comprising one or more clips may be particularly suitable when the first portion of the sample support is not connected to the second portion of the sample support.

The sample support may be removably couplable to the sample support positioning assembly. This may advantageously allow the sample support to be replaced with another sample support having a different cross-section dimension, preferably a different cross-sectional diameter. A user may select an appropriately sized sample support for the size of the sample for inspection. The smaller the sample support, the closer the sample may be positioned to the x-ray source and so higher magnifications may be achieved. However, a the sample support may preferably be selected that is large enough to completely surround the sample for inspection.

The sample support may be removably coupled to the sample support positioning assembly using a fixing mechanism. For example, C-clamps may be used to removably couple the sample support to the sample support positioning assembly. C-clamps are advantageously simple to use and reliably secure the samples support to the sample support positioning assembly.

The sample support positioning assembly may comprise a base. The base may fit into the x-ray inspection system. In particular, the base may fit onto a stage of the x-ray inspection system. The base may take the form of a tray. The sample support positioning assembly may comprise a frame attached to the base to which the sample support is connected. The x-ray source may be positioned on the opposite side of the base to the sample support so that x-rays generated by the x-ray source pass through the base before reaching the x-ray detector. Thus, the magnification of images captured by the x-ray detector may increase the smaller the gap between the sample support and the base. The gap between sample support and the base may be 1 millimetre or less, preferably 0.5 millimetres or less.

The base may comprise a window configured such that when the sample support is positioned between the x-ray source and x-ray detector, x-rays pass through the window. The window may be formed of a low attenuation material. Such materials may have a low atomic number or low density, or both. The window may be formed of carbon fibre. Alternatively, the window may be an opening in the base.

The x-ray inspection system may comprise one or more x-ray filters between the x-ray source and x-ray detector configured to absorb parasitic low energy x-rays. The one or more x-ray filters may comprise copper or zinc. An x-ray filter comprising copper may have a thickness of about 100 microns. An x-ray filter comprising zinc may have a thickness of about 150 microns.

A first x-ray filter may be positioned between the x-ray source and the sample. The first x-ray filter may provide beam hardening of the x-rays emitted by the x-ray source. The first x-ray filter may be supported by the base and may extend over the window of the base. The first x-ray filter may take the form of a coating on the window in the base. The x-ray inspection system may comprise a second x-ray filter positioned between the sample and the x-ray detector. The second x-ray filter may be configured to absorb parasitic low energy scattered x-rays to prevent them from reaching the detector.

Alternatively, or in addition, the sample support may comprise a x-ray filter. The sample support x-ray filter may be in the form of a coating on the outer shell of the sample support. X-rays passing through the sample support may pass through the sample support x-ray filter twice. Thus, x-rays passing through the sample support may experience beam hardening and parasitic low energy scattered x-rays may be absorbed.

The frame may be movable about a pivot fixed relative to the base. This may advantageously allow the position of the frame to be adjusted relative to the base. In some embodiments, this may advantageously allow the sample support to be moved closer to or further away from the base such that the magnification of images of the sample captured by the x-ray detector can be adjusted. The frame may be positioned relative to the base in another manner, such as being translated linearly along a track toward and away from the base.

A movable frame may be particularly advantageous for allowing differently sized sample supports to be removably coupled to the sample support positioning assembly. The position of the frame may be adjustable to allow for sample supports having different diameters to be coupled to the sample support positioning assembly. Thus, a gap between sample support and the base of 1 millimetre or less, preferably 0.5 millimetres or less, may be advantageously maintained irrespective of the size of sample support.

The sample positioning assembly may comprise a prop for holding the frame in a predetermined position with respect to the base.

A different sized prop may be used when a differently sized sample support is coupled to the sample support positioning assembly.

Alternatively, the sample positioning assembly may comprise a prop for holding the frame in one of a plurality of predetermined positions with the respect to the base. The frame may be held a different distance from the base in each of the predetermined positions. This advantageously allows a user to select a predetermined position of the frame that is suitable for a particular size of sample support coupled to the sample support positioning assembly without changing the prop. The prop may comprise a plurality of slots or holes. Each of the plurality of slots or holes may be configured to removably receive an engagement element of the frame to hold the frame in one of the predetermined positions. The engagement element may comprise a spring-loaded bolt configured to be removably receivable in each of the plurality of slots or holes. Alternatively, the prop may comprise a plurality of engagement elements each configured to be removably receivable in a slot or hole in the frame in one of the predetermined positions.

A first end of the prop may be fixed to the base. The prop may extend upwards from the first end. The plurality of slots may be distributed along the length of the prop. The sample positioning assembly may preferably comprise a second prop comprising corresponding slots or engagement elements to the first prop. The first and second props may be positioned on opposite sides of the frame. The first and second props may be fixed to the base at respective first ends. The first and second props may support the frame from opposite sides. This may advantageously provide improved mechanical stability compared to an arrangement comprising a single prop.

The sample positioning assembly may further comprise a means to adjust pitch of the frame with respect to the base in the form of a screw. Fine adjustments may be made by turning the screw.

The sample support positioning assembly may comprise a encoder configured to measure the position of the frame relative to the base. This may allow the distance between the sample support and the base to be determined and so may advantageously allow for calibration of images captured by the x-ray detector or magnification calculations to be made.

The x-ray inspection system may comprise a controller including an image processor. The image processor may be connected to the x-ray detector to receive data from the x-ray detector. The image processor may be configured to perform a computed tomography calculation to generate a three dimensional reconstruction of the sample based on a series of two-dimensional images captured by the x-ray detector.

The sample support positioning assembly further comprise a rotational drive configured to rotate the sample support about a rotational axis. The rotational drive may be fixed to the frame of the sample support positioning assembly.

The rotational drive may comprise a motor. The motor may be connected to the image processor and may output positional information to the image processor. The change of position and, particularly, the change of rotation of the sample with respect to the x-ray source and detector between images may be used in a computed tomography calculation. Precise positional information is required when producing a three dimensional reconstruction of the sample. The more precise the positional information for the sample, the better the image resolution.

The motor may be offset from the rotational axis. The rotational drive may comprise a linkage between the motor and the sample support. The offset motor may advantageously be positioned on an opposite side of the rotational axis to the x-ray source in use. For example, if, in use, the x-ray source is below the rotational axis, the motor may be positioned above the rotational axis. This may advantageously allow a motor or linkage to be provided that is larger than the sample support in a direction perpendicular to the rotational axis without increasing the minimum distance between the sample and x-ray source and so without limiting the maximum magnification of the x-ray inspection system. By offsetting the motor from the rotational axis, a more powerful motor may be used without limiting magnification. Alternatively or additionally, larger gearing may be used in the linkage. This may advantageously allow for precise control of the rotation of the sample support.

The linkage may comprise a drive gear connected to the motor. The drive gear may be coupled to a gear to which the sample support is directly or indirectly coupled. The drive gear may be coupled to the sample support via one or more anti-backlash gears. The one or more anti-backlash gears may advantageously reduce or eliminate backlash to ensure stable rotation of the sample support and so ensure good image quality captured at the x-ray detector. This may be particularly advantageous when the centre of mass of the sample received in the sample support is offset from the rotational axis. Without the anti-backlash gears, the mass of the sample may cause a backlash working against the direction of rotation at certain orientations. Alternatively, the drive gear may be coupled to the sample support via a toothed belt.

The sample support may clamp the sample for inspection such that the sample lies on the rotational axis. Therefore, when a series of images are captured of sample different orientations with respect to the x-ray source, each image may overlap along the axis. This may advantageously reduce the computational complexity of creating a three-dimensional reconstruction of the sample from the series of two-dimensional images.

The x-ray inspection system may comprise a vertical positioning mechanism for moving the sample support positioning assembly, and so the sample support, in a vertical direction, towards or away from the x-ray source. As described, the magnification of images captured by the x-ray detector depends on the distance between the x-ray source and the sample. Thus, moving the sample support towards or away from the x-ray source may advantageously allow for magnification control. The vertical positioning mechanism may move the sample support by moving the sample support positioning assembly. When the sample support positioning assembly comprises a base, the vertical positioning mechanism may be configured to move the base.

The x-ray inspection system may comprise a first horizontal positioning mechanism for moving the sample support positioning assembly, and so the sample support, in a first horizontal direction and a second positioning mechanism for moving the sample support in a second horizontal direction. The first and second horizontal directions may be orthogonal to the vertical direction and define a horizontal plane. The first and second horizontal positioning mechanisms may move the sample support by moving the sample support positioning assembly. When the sample support positioning assembly comprises a base, the first and second horizontal positioning mechanisms may be configured to move the base.

The x-ray inspection system may comprise a sample support position detection assembly comprising a non-contact position measuring device positioned adjacent to the sample support positioning assembly and configured to detect a position or change of position of the sample support positioning assembly. The non-contact position measuring device may measure the position of the sample support positioning assembly in the vertical direction. The non-contact position measuring device may comprise a laser interferometer, an optical linear encoder, a magnetic encoder, or a capacitive sensor, for example.

The x-ray inspection system may comprise a further non-contact position measuring device for measuring the position of the sample support positioning assembly in each of the first and second horizontal directions. Any non-contact position measuring devices may output positional information relating to the sample to image processor.

Changes in position of the sample in the vertical and first and second horizontal directions with respect to the x-ray source and detector between images may be used in a computed tomography calculation.

The sample support may be suitable for removably clamping electronic components. The sample may have a length of between 12 millimetres and 250 millimetres. The sample may have a width of between 15 millimetres and 130 millimetres.

In a second aspect of the invention, there is provided an x-ray imaging accessory for an x-ray inspection system. The x-ray imaging accessory comprises a sample support and
   a sample support positioning assembly comprising a rotational drive configured to rotate the sample support about a rotational axis. The sample support comprises a pliable material and is configured to removably clamp a sample for inspection in a fixed position with respect to the sample support and configured so that, in use, at least one surface of the sample is in contact with the pliable material.

The sample support may be coupled to the sample support positioning assembly. In particular, the sample support may be coupled to the rotational drive. The sample support may be removably coupled to the rotational drive.

The x-ray imagining accessory may be configured for fitting into an x-ray inspection system comprising an x-ray source and an x-ray detector such that the sample support is positioned between the x-ray source and the x-ray detector. In use, the rotational drive may advantageously allow the sample support to be rotated about the rotational axis such that a series of two-dimensional images of the sample are captured by the x-ray detector, each with the sample at a different angle of rotation about the axis. The axis advantageously extends in a direction orthogonal to a straight line extending between the x-ray source and the x-ray detector. The series of two-dimensional images may be used to create a three-dimensional reconstruction of the sample in a computed tomography application.

The rotational drive may comprise a motor. The motor may be offset from the rotational axis. The rotational drive may comprise a linkage between the motor and the sample support. The linkage may comprise a drive gear connected to the motor. The drive gear may be coupled to a gear coupled to the sample support. The drive gear may be coupled via one or more anti-backlash gears The pliable material may be a material that bends easily without breaking and so may conform to the shape of the at least one surface of the sample it contacts. In a preferred embodiment, the sample may be surrounded by the pliable material in use such that all sides of the sample are contacted by, and supported by, the pliable material. Alternatively, the sample may be in contact with a more rigid material on one side and in contact with the pliable material on an opposite side so that the sample is clamped between the pliable material and the more rigid material.

The pliable material may be a resilient material. The pliable material may be a compressible foam. A compressible foam may be resilient. A compressible foam may have a low density and advantageously have a low x-ray attenuation coefficient. A compressible foam having a low x-ray attenuation coefficient may comprise materials having a low atomic number or low density, or both.

The sample support may be configured to completely surround the sample in use.

The sample support may comprise an outer shell comprising a material having a greater rigidity than the pliable material. The outer shell may advantageously provide dimensional stability to the sample support, and reduce bending or deformation of an outer surface of the sample support. The outer shell may also retain the pliable material, thereby providing a clamping force on the sample or samples held within the sample support. The outer shell may completely surround the pliable material. In use, a sample clamped by the pliable material may be entirely received within the outer shell. The outer shell may comprise at least one of carbon fibres or aramid fibres. Alternatively, or in addition, the outer shell may comprise polyether ether ketone (PEEK). Alternatively, the outer shell may comprise a low-density metal such as aluminium. An outer shell comprising carbon fibres, aramid fibres, PEEK or low density metal may advantageously have a high rigidity while also having a low density and low x-ray radiation attenuation. Such materials may advantageously also be resistant to degradation by x-ray beams passing through the outer shell.

The sample support may have a longitudinal axis and the outer shell may define a shape having a cross-section extending along the longitudinal axis. Preferably, the cross-section of the outer shell is substantially circular such that x-rays passing through sample support pass through substantially the same depth of the same materials of the sample support irrespective of the angle of rotation of the sample support. A sample support having a circular cross-section may have a cylindrical shape. The sample support may have a diameter of between 15 millimetres and 130 millimetres.

When the outer shell is not substantially circular, the cross-section may preferably have an order of rotational symmetry high enough that each two-dimensional image used to form the three-dimensional reconstruction can be taken at a line of symmetry. The cross-section may have an order of rotational symmetry of at least 16, 32, 64, 128, 256, 512 or 720.

The outer shell may define an interior space. The interior space may be filled with the pliable material.

The sample support may comprise a first portion and a second portion. The first portion may be moveable relative to the second portion between an open position and a closed position. In the open position the sample support may be able to receive a sample. In the closed position the sample support may clamp a sample received in the sample support between the first portion and the second portion of the sample support.

The first portion may comprise a first portion of pliable material. The second portion may comprise a second portion of pliable material. The pliable material in the second portion is advantageously the same as the pliable material in the first portion, or at least has substantially the same x-ray attenuation coefficient. When a sample is received in the closed sample support, the first and second portions of the pliable material may each contact at least one surface of the sample and conform to the shape of the at least one surface such that the sample is supported by the pliable material and secured in position with respect to the sample support.

The first portion of the sample support may be connected to the second portion of the sample support by a hinge. The first portion of the sample support may be moveable relative the second portion of the sample support via the hinge. The hinge may comprise a flexible resin or a flexible adhesive tape secured to the first and second portion of the sample support. Alternatively, the hinge may comprise a strip or strips of Mylar, each strip or strips of Mylar secured to the first and second portion of the sample support, for example using an adhesive tape. Alternatively, the first portion of the sample support may be slidable relative to the second portion of the sample support.

The sample support may comprise a means to retain the first portion and the second portion in the closed position.

The means to retain the first portion and the second portion in the closed position may comprise an adhesive tape configured to be removably secured to the first and second portion of the sample support. Alternatively, the first portion of the sample support may engage with second portion of the sample support in the closed position.

The sample support may be removably couplable to the sample support positioning assembly. This may advantageously allow the sample support to be replaced with another sample support having a different cross-section dimension, preferably a different cross-sectional diameter. A user may select an appropriately sized sample support for the size of the sample for inspection. The smaller the sample support, the closer the sample may be positioned to the x-ray source and so higher magnifications may be achieved. However, a the sample support may preferably be selected that is large enough to completely surround the sample for inspection.

The sample support may be removably coupled to the sample support using a fixing mechanism. For example, C-clamps may be used to removably couple the sample support to the sample support positioning assembly. C-clamps are advantageously simple to use and reliably secure the samples support to the sample support positioning assembly. Alternatively, the fixing element may comprise a quick release mechanism. The quick release mechanism may comprise a spring-loaded element, such as a spring-loaded bolt. The spring-loaded element may be part of the sample support and be configured to releasably engage the sample support positioning assembly to secure the sample support to the sample support positioning assembly. Alternatively, the spring-loaded element may be part of the sample support positioning assembly and be configured to releasably engage with the sample support to secure the sample support to the sample support positioning assembly.

The quick release mechanism may comprise a dog clutch. The sample support may comprise a first part of the dog clutch. The sample support positioning assembly may comprise a second part of the dog clutch. In this way, the sample support can be engaged to the sample support positioning assembly via the two parts of the dog clutch. The use of a dog clutch advantageously reduces slippage between the sample support and sample support positioning assembly. The spring-loaded element may comprise one of the first and second parts of the dog clutch so that the parts of the dog clutch are urged together. The first and second part of the dog clutch may each comprise corresponding teeth configured to engage one another. The teeth may be tapered.

The sample support positioning assembly may comprise a base. The base may be suitable for fitting into an x-ray inspection system. In particular, the base may fit onto a stage of an x-ray inspection system. The base may take the form of a tray. The sample positioning assembly may comprise a frame attached to the base to which the sample support is connected. The gap between sample support and the base may be 1 millimetre or less, preferably 0.5 millimetres or less. The frame may comprise the rotational drive. The frame may be movable about a pivot fixed relative to the base. This may advantageously allow the position of the frame to be adjusted relative to the base. The sample positioning assembly may comprise a detector configured to measure the position of the frame relative to the base.

The base may comprise a window configured such that when the sample support is positioned between an x-ray source and an x-ray detector, x-rays pass through the window. The window may be formed of a low attenuation material. Such materials may have a low atomic number or low density, or both. The window may be formed of carbon fibre. Alternatively, the window may be an opening in the base.

The sample support positioning assembly may comprise one or more x-ray filters configured to absorb parasitic low energy x-rays. The one or more x-ray filters may comprise copper or zinc. An x-ray filter comprising copper may have a thickness of about 100 microns. An x-ray filter comprising zinc may have a thickness of about 150 microns.

A first x-ray filter may be positioned between the x-ray source and the sample. The first x-ray filter may provide beam hardening of the x-rays emitted by an x-ray source. The first x-ray filter may be supported by the base and may extend over the window of the base. The first x-ray filter may take the form of a coating on the window in the base. The x-ray inspection system may comprise a second x-ray filter positioned between the sample an x-ray detector. The second x-ray filter may be configured to absorb parasitic low energy scattered x-rays to prevent them from reaching the detector.

Alternatively, or in addition, the sample support may comprise a x-ray filter. The sample support x-ray filter may be in the form of a coating on the outer shell of the sample support. X-rays passing through the sample support may pass through the sample support x-ray filter twice. Thus, x-rays passing through the sample support may experience beam hardening and parasitic low energy scattered x-rays may be absorbed.

The sample support may comprise an x-ray filter. The x-ray filter may be in the form of a coating on the outer shell of the sample support. The x-ray filter may be configured to absorb parasitic low energy scattered x-rays to prevent them from passing through the sample. The x-ray filter layer may comprise copper. The sample support may comprise the x-ray filter. The x-ray filter may be in the form of a coating on the outer shell of the sample support.

Alternatively or additionally, when the x-ray inspection system comprises a base, the base may comprise the x-ray filter. When the base comprises a window, the it may be the window that comprises the x-ray filter.

In a third aspect of the invention, there is provided a sample support for an x-ray inspection system comprising a pliable material and a mechanical interface for connection with a rotational drive. The sample support is configured to removably clamp a sample for inspection in a fixed position with respect to the sample support and configured so that, in use, at least one surface of the sample is in contact with the pliable material.

The provision of the mechanical interface may allow the sample support to be connected to a rotational drive of a sample support assembly which may be part of an x-ray inspection system. The mechanical interface may advantageously allow for the sample support to be removably connected to the rotational drive such that the sample support can easily be connected to or removed from the rotational drive. The mechanical interface may comprise a protrusion or axle. The protrusion or axle may be connectable to the rotational drive, for example to an axle of a motor. The connection may be via a clamping mechanism for example a C-clamp.

In use, a sample support connected to a rotational drive may be rotatable about a rotational axis. The sample support may clamp the sample for inspection such that the sample lies on the rotational axis of the sample support.

The sample support may comprise a second mechanical interface on an opposite side of the sample support to the first mechanical interface. The second mechanical interface may be for connection to a second axle or protrusion of the sample support positioning assembly.

The pliable material of the sample support may be a material that bends easily without breaking and so may conform to the shape of the at least one surface of the sample it contacts. In a preferred embodiment, the sample may be surrounded by the pliable material in use such that all sides of the sample are contacted by, and supported by, the pliable material.

The pliable material may be a resilient material. The pliable material may be a compressible foam. A compressible foam may be resilient. A compressible foam may have a low density and advantageously have a low x-ray attenuation coefficient. A compressible foam having a low x-ray attenuation coefficient may comprise materials having a low atomic number or low density, or both.

The sample support may be configured to completely surround the sample in use.

The sample support may comprise an outer shell comprising a material having a greater rigidity than the pliable material. The outer shell may advantageously provide dimensional stability to the sample support, and reduce bending or deformation of an outer surface of the sample support. The outer shell may also retain the pliable material, thereby providing a clamping force on the sample or samples held within the sample support. The outer shell may completely surround the pliable material. In use, a sample clamped by the pliable material may be entirely received within the outer shell.

The outer shell may comprise at least one of carbon fibres or aramid fibres. Alternatively, or in addition, the outer shell may comprise polyether ether ketone (PEEK). Alternatively, the outer shell may comprise a low-density metal such as aluminium. An outer shell comprising carbon fibres, aramid fibres, PEEK or low-density metal may advantageously have a high rigidity while also having a low density and low x-ray radiation attenuation. Such materials may advantageously also be resistant to degradation by x-ray beams passing through the outer shell. The sample support may have a longitudinal axis and the outer shell may define a shape having a cross-section extending along the longitudinal axis. Preferably, the cross-section of the outer shell is substantially circular such that x-rays passing through sample support pass through substantially the same depth of the same materials of the sample support irrespective of the angle of rotation of the sample support. A sample support having a circular cross-section may have a cylindrical shape. The sample support may have a diameter of between 15 millimetres and 130 millimetres.

When the outer shell is not substantially circular, the cross-section may preferably have an order of rotational symmetry high enough that each two-dimensional image used to form the three-dimensional reconstruction can be taken at a line of symmetry. The cross-section may have an order of rotational symmetry of at least 16, 32, 64, 128, 256, 512 or 720.

The sample support may comprise an x-ray filter configured to absorb parasitic low energy x-rays. The x-ray filter may be in the form of a coating on the outer shell of the sample support. The x-ray filter may be configured to absorb parasitic low energy scattered x-rays to prevent them from passing through the sample. The x-ray filter layer may comprise copper.

The sample support may comprise a first portion and a second portion. The first portion may be moveable relative to the second portion between an open position and a closed position. In the open position the sample support may be able to receive a sample. In the closed position the sample support may clamp a sample received in the sample support between the first portion and the second portion of the sample support.

The first portion may comprise a first portion of pliable material. The second portion may comprise a second portion of pliable material. The pliable material in the second portion is advantageously the same as the pliable material in the first portion, or at least has substantially the same x-ray attenuation coefficient. When a sample is received in the closed sample support, the first and second portions of the pliable material may each contact at least one surface of the sample and conform to the shape of the at least one surface such that the sample is supported by the pliable material and secured in position with respect to the sample support.

The first portion of the sample support may be connected to the second portion of the sample support by a hinge. The first portion of the sample support may be moveable relative the second portion of the sample support via the hinge. The hinge may comprise a flexible resin or a flexible adhesive tape secured to the first and second portion of the sample support. Alternatively, the hinge may comprise a strip or strips of Mylar, each strip or strips of Mylar secured to the first and second portion of the sample support, for example using an adhesive tape. Alternatively, the first portion of the sample support may be slidable relative to the second portion of the sample support.

The sample support may comprise a means to retain the first portion and the second portion in the closed position.

This may advantageously ensure that the sample support remains in the closed position in any orientation.

The means to retain the first portion and the second portion in the closed position may comprise an adhesive tape configured to removably secure to the first or second portion of the sample support. Alternatively, the first portion of the sample support may engage with second portion of the sample support in the closed position.

The outer shell may define an interior space. The interior space may be filled with the pliable material.

The sample support may be suitable for removably clamping electronic components. The sample may have a length of between 12 millimetres and 250 millimetres. The sample may have a width of between 15 millimetres and 130 millimetres.

The sample support may be configured to clamp a plurality of samples for inspection simultaneously. The sample support may clamp each of the plurality of samples such that the samples are spaced out along the rotational axis.

In a fourth aspect of the invention there is provided a kit for an x-ray inspection system comprising a plurality of samples supports as defined in the third aspect of the invention wherein each of the plurality of sample supports has a different diameter.

Each of the plurality of sample supports may define a shape having a cross-section extending along a longitudinal axis of the sample support. Each of the sample supports may by cylindrical in shape. Each of the sample supports may have a diameter of between 15 millimetres and 130 millimetres. Exemplary diameters for the sample supports includes 15 millimetres, 20 millimetres, 50 millimetres or 127 millimetres. For example, the kit may comprise three sample supports. The first sample support may have a diameter of 20 millimetres, the second sample support may have a diameter of 50 millimetres and the third sample support may have a diameter of 127 millimetres.

The kit may further comprise a sample support positioning assembly comprising a rotational drive. Each of the plurality of sample supports may be removably couplable to the rotational drive. The sample support positioning assembly may be configured for fitting into an x-ray inspection system comprising an x-ray source and an x-ray detector such that the sample support coupled to the sample support positioning assembly may be positioned between the x-ray source and the x-ray detector. In use, the rotational drive may advantageously allow the coupled sample support to be rotated about the rotational axis such that a series of two-dimensional images of the sample are captured by the x-ray detector. The series of two-dimensional images may be used to create a three-dimensional reconstruction of the sample in a computed tomography application.

Because each sample support is removably couplable to the sample support positioning assembly, a user may select which of the plurality of sample supports is coupled A user may thus select an appropriately sized sample support for the size of the sample for inspection.

In a fifth aspect of the invention there is provided a method of using an x-ray inspection system comprising an x-ray source, an x-ray detector and a sample support comprising a pliable material, the method comprising:
clamping a sample to be inspected in the sample support
  such that the sample is in a fixed position with respect to
  the sample support and at least one surface of the sample
  is in contact with the pliable material;
positioning the sample support between the x-ray source and
  the x-ray detector;
recording an x-ray image of the sample;
rotating the sample support with respect to the x-ray source;
  and
recording a second x-ray image of the sample.

The method may further comprise repeating steps c) and d) a plurality of times. The method may comprise repeating steps c) and d) until at least 32 x-ray images of the sample have been recorded corresponding to at least 32 different rotational positions of the sample. The method may further comprise performing a computed tomography calculation using the recorded x-ray images to generate a three dimensional reconstruction of the sample.

The sample support may comprise a first portion and a second portion, the first portion being moveable relative to the second portion. In that case, the step of clamping the sample to be inspected may comprise:
moving the first portion of sample support relative to the
  second portion of sample support and into an open
  position;
placing a sample in the sample support; and
moving the first portion of sample support relative to the
  second portion of sample support and into a closed
  position in which the sample is clamped by the sample
  support.

It should be clear that features described in relation to one aspect may be applied to other aspects of the invention.

BRIEF DESCRIPTION OF THE DRAWINGS

Embodiments of the invention will now be described in detail, by way of example only, with reference to the accompanying drawings, in which:

FIG. 4 is a perspective view of the sample support of FIG. 1 separately from the x-ray inspection system.

DETAILED DESCRIPTION

Figure 1:
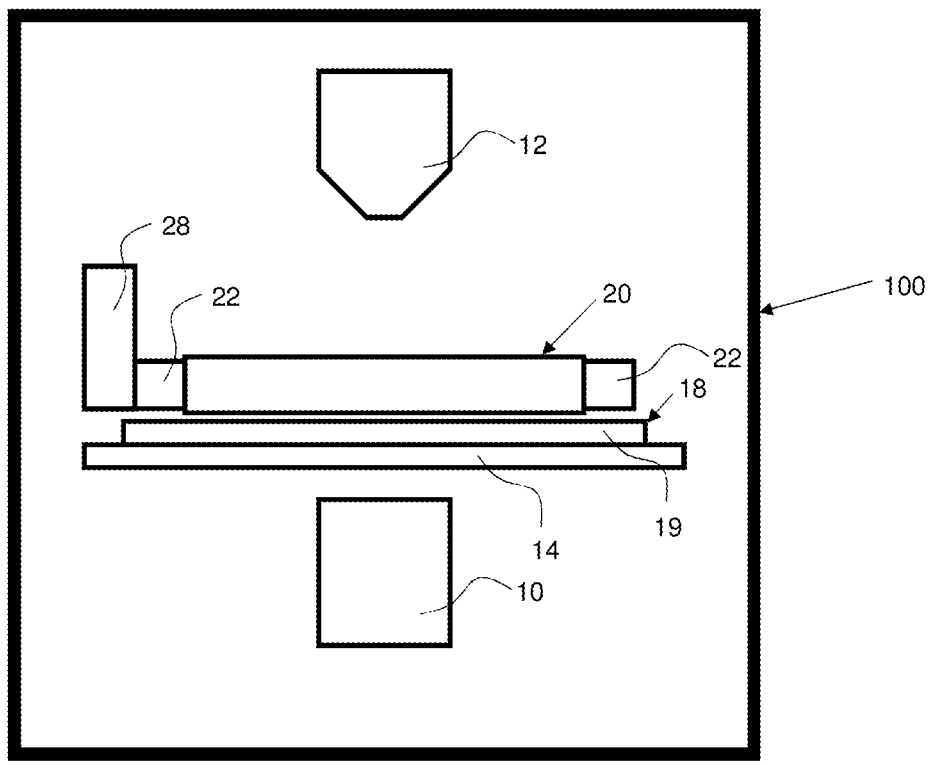
FIG. 1 is a schematic view of an x-ray inspection system comprising a sample positioning assembly and a sample support according to the invention.

FIG. 1 shows a schematic of an x-ray inspection system 100. The operation of such an x-ray inspection system 100 is described in more detail in European patent: EP1766381B1.

The x-ray inspection system 100 comprises an x-ray source in the form of an x-ray tube 10 and an x-ray detector 12. Between the x-ray tube 10 and the x-ray detector 12 is a stage 14 moveable in the X, Y and Z directions by suitable slideways and under the control of electric motors. The stage 14 is formed by an open framework (not shown in FIG. 1) and is adapted to support the base 19 of a sample support positioning assembly 18.

A sample support 20 is coupled to a frame 22 of the sample support positioning assembly 18. A sample to be inspected can be received in the sample support 20. The sample received in the sample support 20 is moveable with respect to the x-ray tube 10 and the x-ray detector in the X-Y plane and in the Z axis by moving the stage 14. The sample support positioning assembly 18 further comprises a rotational drive 28 coupled to a mechanical interface of the sample support. The rotational drive 28 can be used to rotate the sample support 20 about a rotational axis perpendicular to the Z-axis.

The x-ray inspection system 100 also comprises a controller including an image processor. The controller is not shown in the figures. The image processor is connected to the x-ray detector 12 to receive data. The image processor is configured to perform a computed tomography calculation to generate a three dimensional reconstruction of the sample based on a series of two-dimensional images captured by the x-ray detector with the sample support at different rotational positions. The controller is also used to control the movement of the stage 14 in the X, Y and Z directions as well as the rotation of the rotational drive 28.

In this example, the sample support positioning assembly 18 is a sub-assembly that can be retrofit to an existing x-ray inspection system 100. The sample support positioning assembly 18 and the sample support 20 forms part of a kit that can be fitted into and removed from the x-ray inspection system. The kit may include a plurality of different sample supports. In use, the sample support assembly 18 is secured onto stage 14 of the x-ray inspection system. Alternatively, the sample support assembly 18 may be provided as an integral component of an x-ray inspection system.

Figure 2:
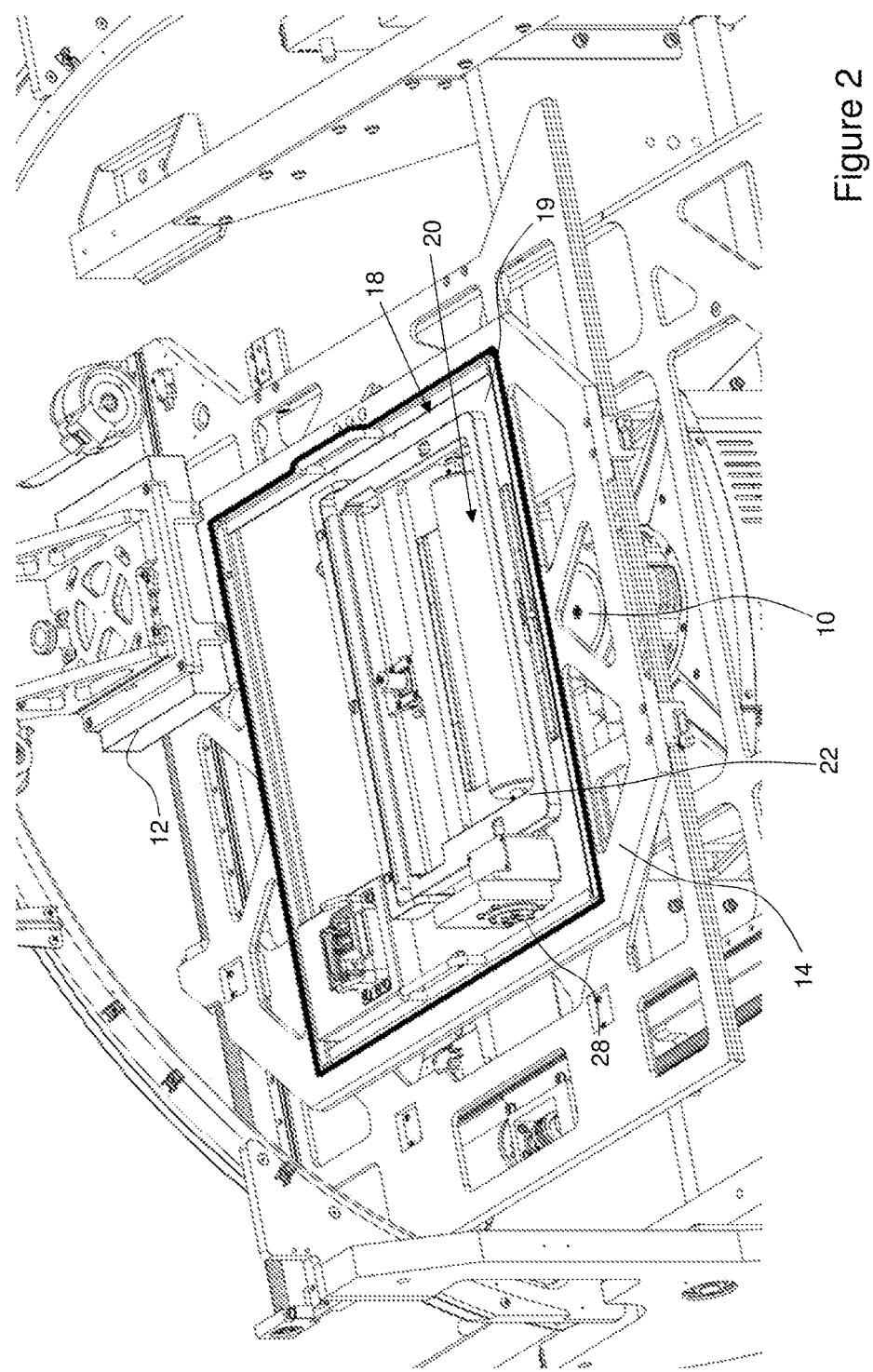
FIG. 2 is a perspective view of a portion of the x-ray inspection system including the sample support positioning assembly.

FIG. 2 shows a perspective view of the sample support positioning assembly 18 fitted into the x-ray inspection system 100. Not all of the x-ray inspection system 100 is visible in FIG. 2. FIG. 2 more clearly shows the stage 14 and the base 19 fitted on to the stage 14.

Figure 3:
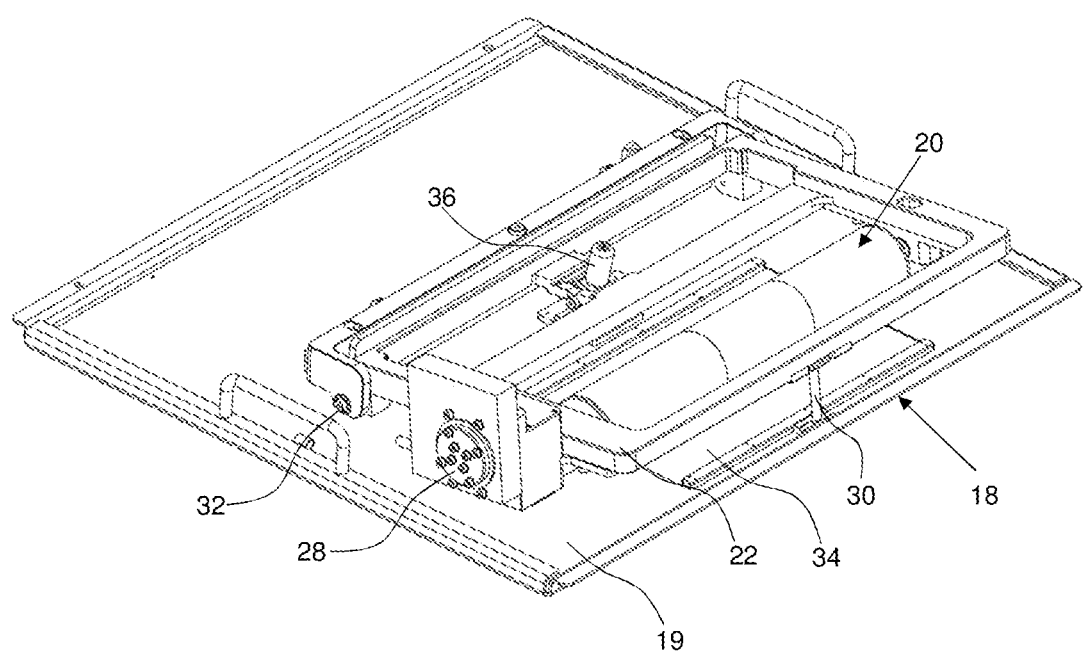
FIG. 3 is a perspective view of a sample support coupled to a sample support positioning assembly according to the invention.

FIG. 3 shows the sample support positioning assembly 18 including a coupled sample support 20, separately from the rest of the x-ray inspection system. As described, the sample support positioning assembly 18 comprises a base 19 and a frame 22. The sample support 20 is coupled to the frame 22 which is moveable about a pivot 32 fixed relative to the base 19. This allows the position of the frame 22 to be adjusted relative to the base 19. The frame is held in place using a prop 30 which is configured to retain the sample support 20 in a position such that the gap between the base 19 and the sample support 20 is 1 millimetre or less. In this position, the magnification of the x-ray inspection system can be maximised because the sample support is positioned as closed as possible to the x-ray source (positioned directly below the base 19) while avoiding collisions between the sample support 20 and the base 19.

The prop 30 shown in FIG. 3 is suitable for holding the frame in a single predetermined position with the respect to the base. The sample support positioning assembly 18 can alternatively comprise a prop suitable for holding the frame in one of a plurality of predetermined positions with respect to the base. In one such arrangement, a first end of the prop is fixed to the base 19. The prop extends upwards and a plurality of slots or holes are formed in the prop, distributed along its length. The frame comprises a spring-loaded bolt configured to removably engage each of the plurality of slots or holes. By engaging the spring-loaded bolt with particular slots or holes, a user can select one of a plurality of predetermined positions for the frame with respect to the base. The sample support positioning assembly 18 can comprise two props, each prop comprising corresponding slots or holes. The two props are fixed to the base 19 at opposite sides of the frame. The frame comprises two spring loaded bolts configured to engage the two props.

The sample support positioning assembly 18 further comprises a screw 36 that is connected to the frame 22 and to the base 19. Turning the screw 36 allows fine adjustments to be made to the pitch of the frame, if necessary. This allows the gap between the base and the sample support 20 to be adjusted.

The base 19 comprises a window 34 located in a region of the base that is positioned between the x-ray tube 10 and the sample support 20 in the x-ray inspection system. This window is formed of carbon fibre and so has a low x-ray radiation attenuation coefficient. The window 34 further comprises a coating comprising copper and having a thickness of 100 microns which acts as an x-ray filter configured to absorb parasitic low energy scattered x-rays to prevent them from passing through the sample. In some embodiments, the sample support 20 can additionally or alternatively comprise the coating comprising copper.

The rotational drive 28 is connected to the frame 22 and so moves with the frame when the frame moves about the pivot 32.

FIG. 4 shows the sample support 20 separately from the rest of the x-ray inspection system. The sample support 20 comprises a first portion 20a and a second portion 20b, the first portion being movable relative to the second portion about a hinge formed of flexible resin. The hinge is not shown in the figures. Alternatively, the first portion 20a is separate to the second portion 20b, without a hinge. The separate first and second portions can be held in position relative to one another in use by a retaining clip that extends around the outside of the first and second portions. The sample support comprises a cylindrical outer shell 42 formed of carbon fibre which also is split into two portions 42a and 42b.

Figure 4A:
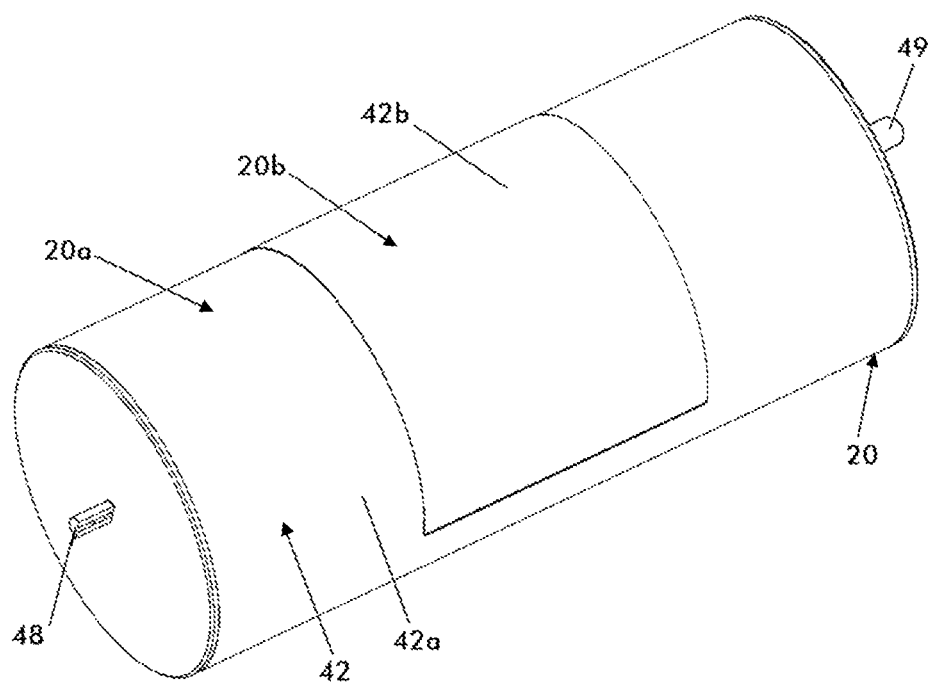
FIG. 4a shows the sample support in a closed position and FIG. 4b shows the sample support in an open position with a sample placed in the sample support.
Figure 4B:
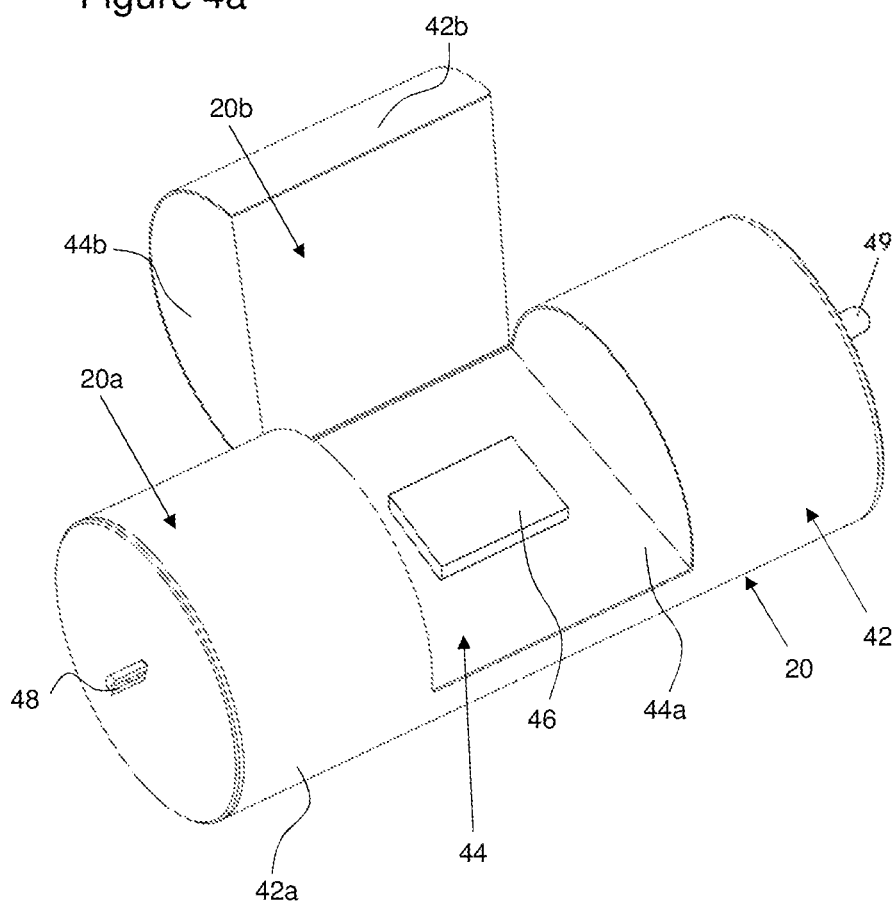

FIG. 4a shows the sample support in a closed position and FIG. 4b shows the sample support in an open position with a sample 46 received in the sample support 20.

The sample support 20 comprises a pliable material 44 in the form of a compressible foam having resilient properties. As shown in FIG. 4b, a first portion of pliable material 44 is associated with the first portion of the sample support and a second portion of pliable material 44b is associated with the second portion of the sample support.

The pliable material 44 fills an interior space defined by the outer shell 42 and is retained by the outer shell 42. In the closed position, surfaces of a sample 46 received in the sample support 20 are contacted by the first and second portions of the pliable material causing the pliable material to be compressed in order to conform to the shape of the sample. The pliable material then applies a clamping force on to the sample sufficient to retain the sample in a fixed position relative to the outer shell. The sample is secured in position within the sample support 20.

Figure 5:
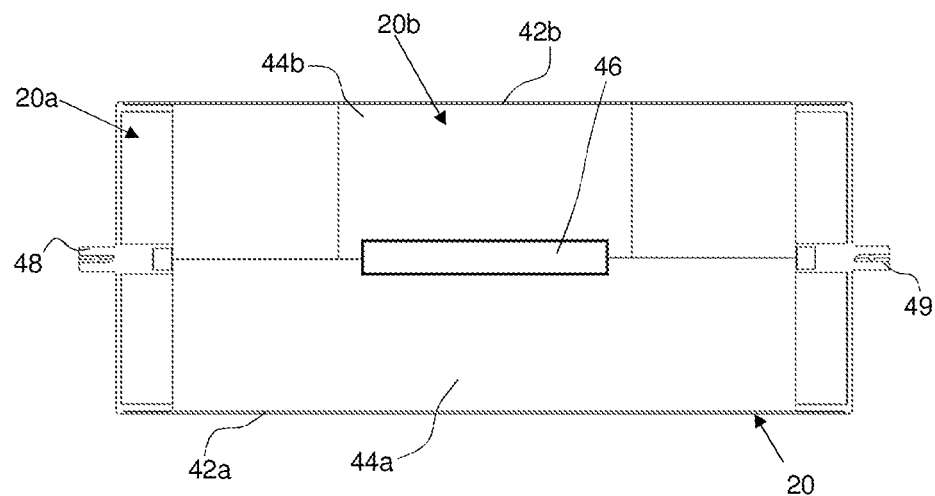
FIG. 5 is a cross-sectional view of the sample support of FIG. 4, in which a sample is received in the sample support.

FIG. 5 is a schematic cross-section of the sample support 20 in the closed position and with a sample 46 received between the first and second portions 44a, 44b of pliable material. The sample 46 is surrounded by pliable material 44 and is completely contained within the outer shell 42 when the sample support 20 is in the closed position. The sample 46 is clamped in a position such that when the sample carrier 20 is rotated by the rotational drive 28, the sample 46 lies on the rotational axis of the sample carrier 20.

As shown in FIGS. 4 and 5, the sample support further comprises two mechanical interfaces 48, 49. These mechanical interfaces take the form of protrusions. The first mechanical interface 48 allows the sample support to be coupled to the rotational drive 28. The second mechanical interface 49 allows the sample support 20 to be coupled to a further axle or protrusion of the frame 22 of the sample support positioning assembly. The coupling of the first mechanical interface 48 to a rotational drive 28 is described in more detail below.

Figure 6:
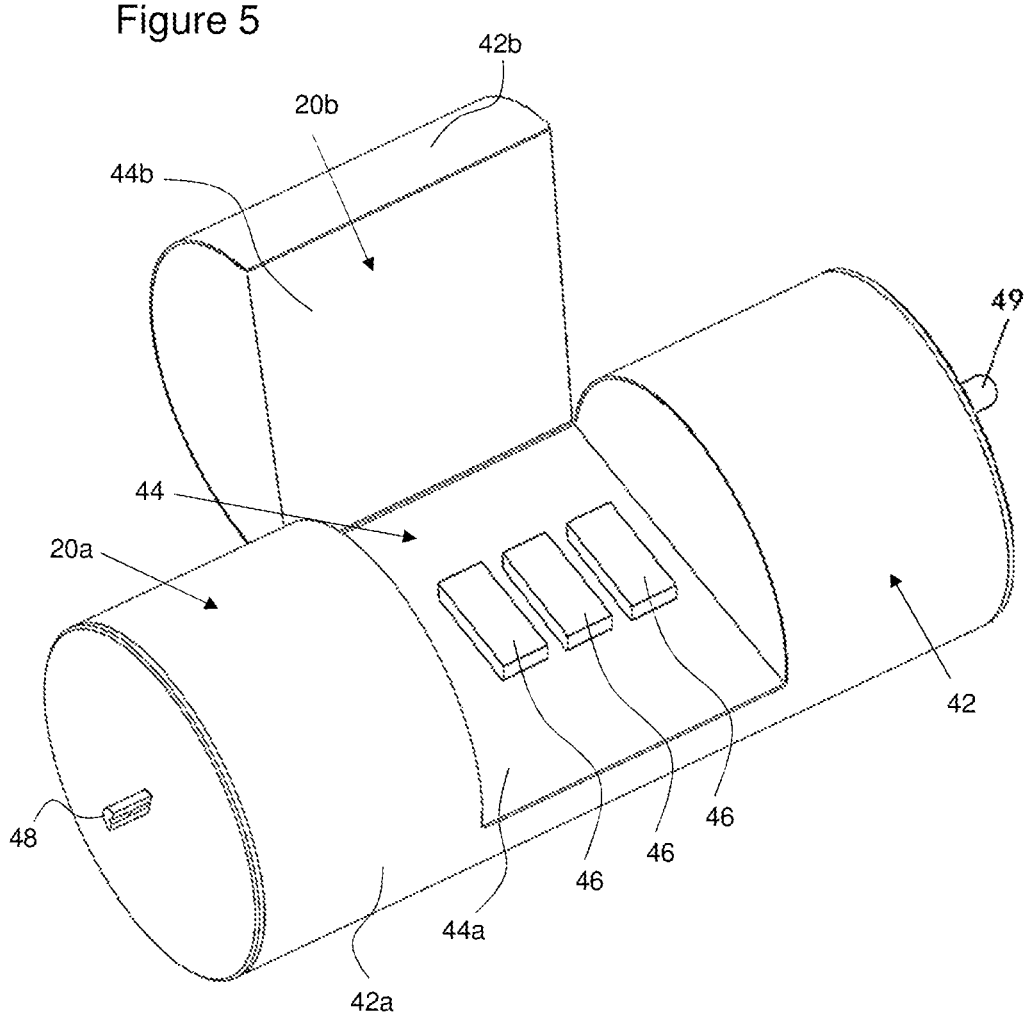
FIG. 6 is a perspective view of a sample support in an open position in which three samples are placed in the sample support.

More than one sample 46 may be received in the sample support 20 to be clamped by the pliable material. FIG. 6 shows an embodiment where three samples 46 are received in sample support 20 in the open position. The samples 46 are spaced apart along the rotational axis. By providing multiple samples in the sample support 20 inspection operations can be performed on each sample without the need for a technician to change sample and restart the inspection system between samples. In other words, the inspection of multiple samples can be automated.

Figure 7:
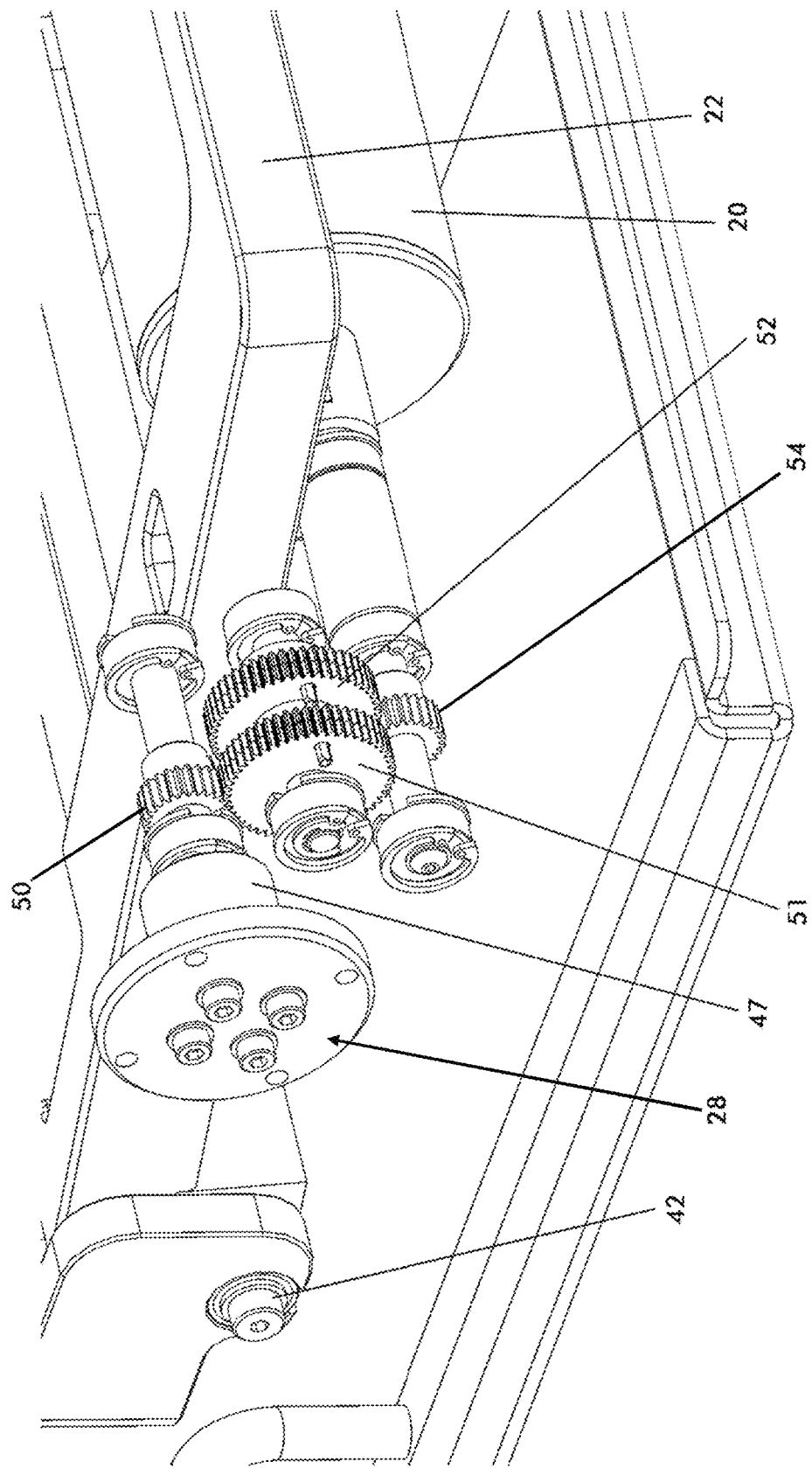
FIG. 7 is a cutaway of a rotational drive as shown in FIG. 3.

FIG. 7 shows a close-up of the rotational drive 28 with the housing of cut-away. The rotational drive 28 comprises an electric motor 47 coupled to a drive gear 50. The drive gear 50 is connected to a first anti-backlash gear 51 which is coupled to a second anti-backlash gear 52. The second backlash gear 52 drives a further gear 54 which is coupled to the sample support. Thus, rotation of the drive gear 50 causes rotation of gear 52 and so rotation of the sample support 20. The anti-backlash gears 51, 52 reduce or eliminate backlash to ensure stable rotation of the sample support 20.

The arrangement of the rotational drive 28 shown in FIG. 7 allows the electric motor 47 to be offset from the rotational axis of the sample support 20. This offsetting allows the rotational drive 28 to extend above the level of the frame 22 (as shown in FIG. 6) and so allows for a larger electric motor 47 or larger gearing to be used without increasing the minimum gap between the sample support 20 and the base 19. Without the offsetting, the rotational drive 28 would also extend below the level of the frame and so would increase the minimum distance between the x-ray source and the base 19. This would decrease the maximum magnification that could be achieved using the x-ray inspection system.

Figure 8:
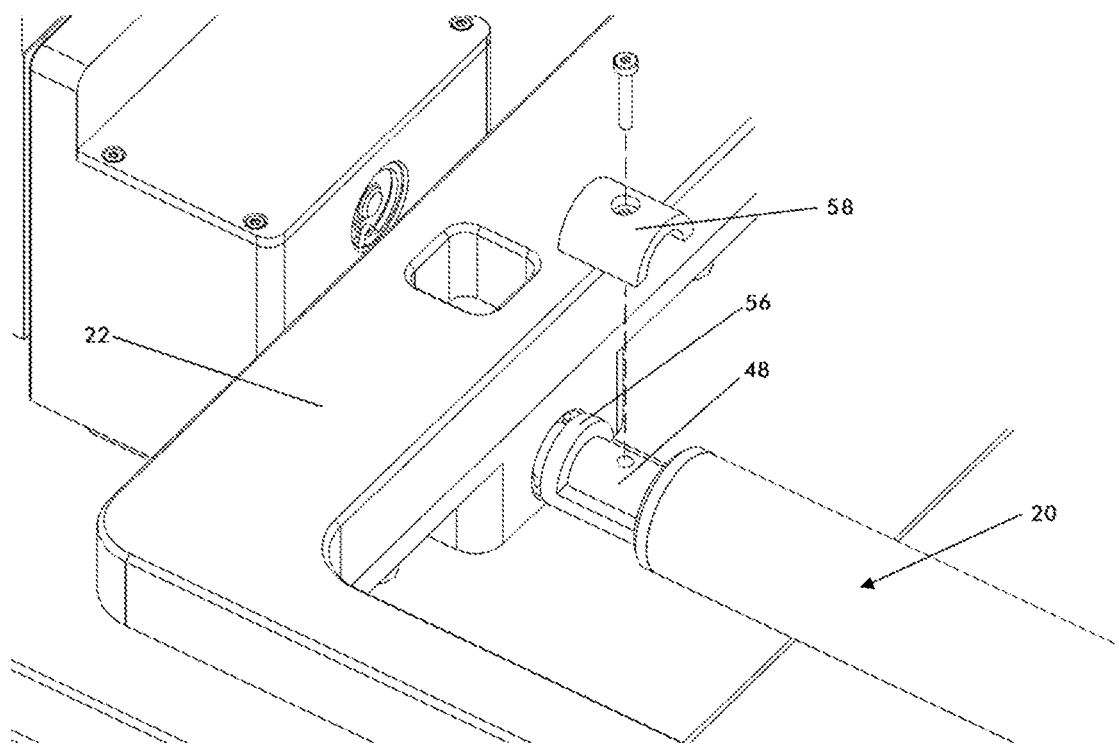
FIG. 8 is a close-up perspective view of the coupling between the rotational drive of the sample support positioning assembly and the sample support of FIG. 3.

FIG. 8 shows the coupling between the sample support 20 and the rotational drive 28. The first mechanical interface 48 of the sample support 20 is connected to a protrusion 56 of the rotational drive 28 using a C-clamp 51. The C-clamp 58 secures the sample support on to the protrusion 56. In use, the protrusion 56 rotates as a result of being driven by the electric motor 47, as described above in relation to FIG. 7. The sample support 20 is secured to the protrusion in such a way that rotation of the protrusion causes the sample support 20 to be rotated about a rotational axis that passes through the centre of the cylindrical sample support 20. This ensures that the sample support 20 does not "wobble" as it is rotated such that the distance between the outer shell 42 and the base 19 remains constant. A similar C-clamp arrangement is used to clamp the second mechanical interface 49 to a second protrusion on the frame that is rotatable. This is not shown in the figures.

The C-clamp arrangement advantageously allows a user to remove and replace the sample support with a different sample support. A quick release mechanism comprising a spring-loaded bolt to releasably secure the sample support to the frame can be used instead of a C-clamp. This similarly allows a user to remove and replace the sample support with a different sample support. This is not shown in the Figures.

Figure 9:
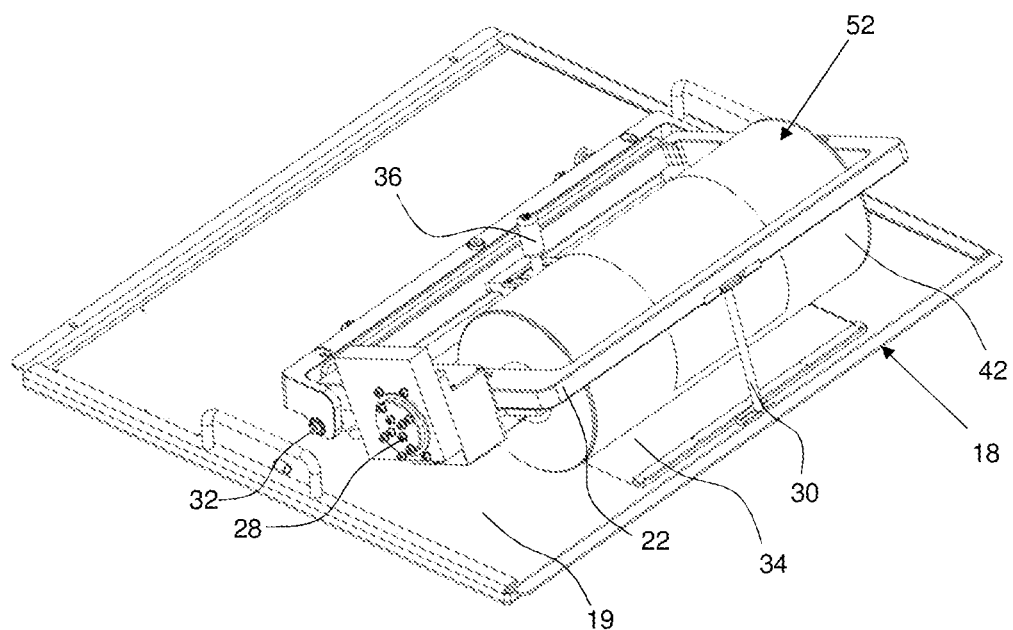
FIG. 9 is a perspective view of a different sample support coupled to the sample support positioning assembly shown in FIG. 3.

FIG. 9 shows an embodiment where the sample support 20 has been replaced with a different sample support 52. Sample support 52 has a larger diameter than sample support 20. The diameter of sample support 20 is 50 millimetres whereas the diameter of sample support 52 is 127 millimetres. These dimensions are exemplary. A wide range of diameter sample supports may be used. In particular, a user can select an appropriately sized sample support for the size of the sample for inspection. Generally, it is beneficial to use the smallest diameter of sample support possible while ensuring that the sample is completely contained in and surrounded by the sample. This is because the smaller the sample support, the closer the sample can be positioned to the x-ray source and so higher magnifications can be achieved.

Figure 10:
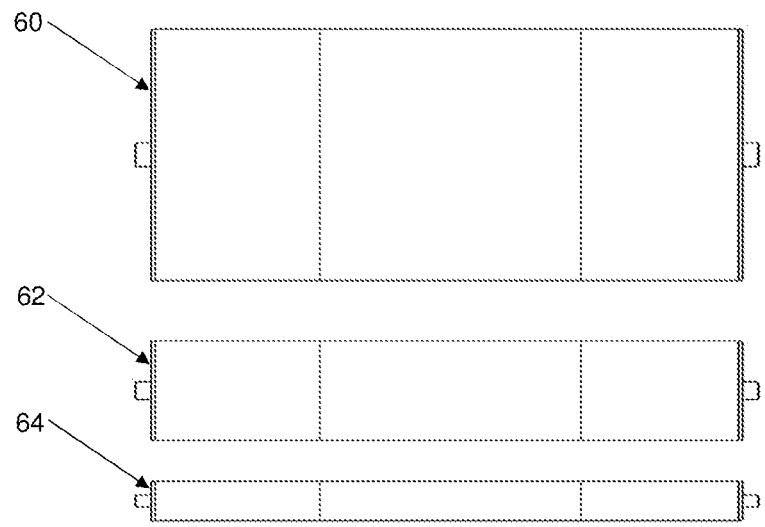
FIG. 10 illustrates a kit comprising a sample support positioning assembly and a plurality of sample supports, each sample support being couplable to the sample positioning assembly and having a different diameter.
Figure 10:
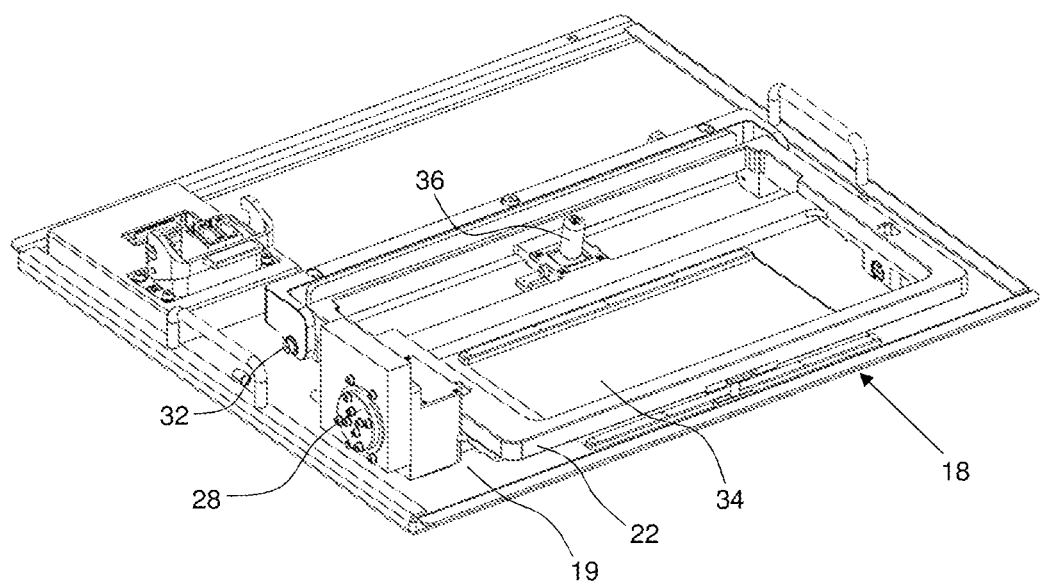

FIG. 10 shows a kit comprising three sample supports 60, 62 and 64 of different size and the sample support positioning assembly 18 as already described. Each of the sample supports is removably couplable to the sample support positioning assembly as described above.

Figure 11:
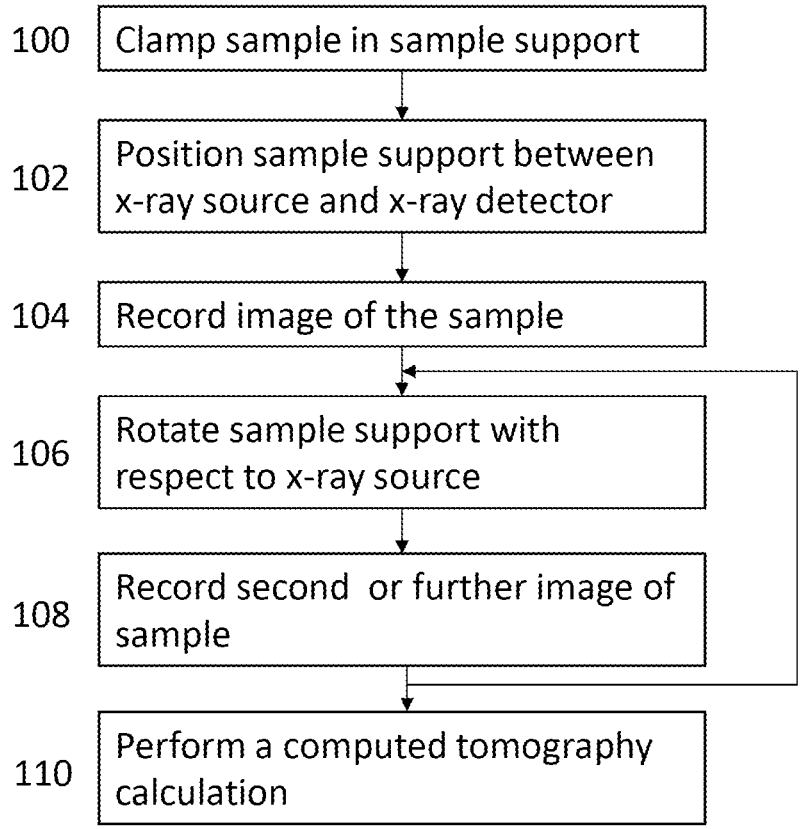
FIG. 11 is a flow-chart of a method of using the x-ray inspection system according to the invention.

FIG. 11 is a flow diagram outlining a method of using the x-ray inspection system shown in FIG. 1.

In step 100, a sample is clamped in the sample support 20 which is coupled to the sample support positioning assembly 18 which, in turn, is supported by the stage 14 of the x-ray inspection system.

Clamping the sample 46 comprises moving the first portion 20a of the sample support relative to the second portion 20b about the hinge and such that the sample support is in the open position shown. The sample 46 is then placed in the sample support, on the first portion of pliable material 44a. This is shown in FIG. 3b. Of course, any number of samples may be placed in the sample support, spaced out along the length of the sample support 20. FIG. 5 shows an example where three sample are placed on the first portion of pliable material 44a.

Once the sample has been placed in the sample support, the first portion of the sample support 20a is moved relative to the second portion 20b into a closed position. This is shown in FIGS. 3a and 4. In the closed position, surfaces of the sample 46 received in the sample support 20 are contacted by the first and second portions of pliable material causing the pliable material to be compressed in order to conform to the shape of the sample. The pliable material then applies a clamping force on to the sample sufficient to retain the sample in a fixed position relative to the outer shell 42. The sample is secured in position within the sample support 20. The sample is clamped in the sample support.

In step 102, the sample support is positioned between the x-ray source and x-ray detector. This step can comprise using the controller to move the stage 14 in the X, Y and Z axis under the control of suitable motors such that the sample positioning sample assembly 18 is generally positioned between the x-ray source and x-ray detector if it is not already positioned there. The sample support in the sample support positioning assembly 18 can also be adjusted in this step. For example, the position of the frame 22 with respect to the base 19 may be adjusted. The prop 30 can be used to hold the frame 22 in a predetermined position with respect to the base 19. Other fine adjustments can be made, for example, by turning screw 36.

In step 104, a (first) image of the sample is recorded. The image of the sample is recorded by the x-ray detector 12 and received by the controller. The image is a two-dimensional image of a section through the sample 46. The magnification of the image of the sample depends upon the distance between the sample and the x-ray source 10. Thus, if high magnification images are desired, this distance should be minimized. This can achieved in step 100 by moving the stage 14 as close as possible to the x-ray source 10 in the Z-direction and by reducing the gap between the sample support 20 and the base 19 of the sample support positioning assembly 18 to be as small as possible, preferably such that the gap is less than 1 millimetre or, even more preferably less than 0.5 millimetres.

In step 106, the sample support 20 is rotated with respect to x-ray source 10. This rotation is achieved using the rotational drive 28. The electric motor 47 of the rotational drive is controlled by the controller.

In step 108, a second image of the sample is recorded. Again, this image is recorded by the x-ray detector 12 and received by the controller.

Steps 106 and 108 are repeated until the sample has been rotated through 360 degrees. In other words, steps 106 and 108 are repeated until the sample support is returned to the position in which the first image was recorded. Thus, the controller receives a series of two-dimensional images captured by the x-ray detector throughout the course of the x-ray inspection process.

At step 110 a computed tomography calculation is performed using the recorded x-ray images to generate a three dimensional reconstruction of the sample. The image processor of the controller is used to perform the computed tomography calculation.

The greater the number of images, and so imaging positions, of the sample in the sample support the better the three dimensional reconstruction. Typically, at least 16 images of the sample are required and so steps 106 and 108 are repeated at least 14 times. For example, the method may comprise repeating steps 106 and 108 14, 30, 62, 126, 254, 510 or 718 times. Preferably, the angle of rotation between each image is equal.

The sample 46 being clamped in the sample support results in the sample 36 being held in a fixed position within the sample support as the sample support is rotated into each of the imaging positions. In other words, movement of the sample with respect to the sample support is prevented. This results in the creation of an accurate three-dimensional reconstruction of the sample.

When multiple samples are clamped in the sample support, it may only be possible to image one of the samples at a time. In this case, after a three-dimension reconstruction of the first sample has been generated, the method is repeated for the second sample including positioning the second clamped between the x-ray source and x-ray detector by moving the stage 14. This process can be automated, allowing multiple samples to be inspected automatically without the sample needing to be replaced between imaging operations.

Because the sample(s) are removably clamped by the pliable material, they can easily be removed from the sample support after the imaging operations are complete. The method can then be repeated using different samples in the sample support.

As described previously, the sample support 20 is removably coupled to the sample support positioning assembly 18 which allows for different sample supports to be coupled to the sample support positioning assembly 18. In particular, this allows for sample supports of different diameter to be coupled to the sample support positioning assembly 18. As such, step 100 may comprise selecting a suitably sized sample support for sample(s) being inspected. The smaller the sample support, the closer the sample can be positioned to the x-ray source and so higher magnifications may be achieved. However, a the sample support should be selected that is large enough to completely surround the sample for inspection.

The invention claimed is:

1. An x-ray inspection system comprising:
   an x-ray source;
   an x-ray detector;
   a sample support comprising a pliable section; and
   a sample support positioning assembly configured to position the sample support between the x-ray source and the x-ray detector;
   wherein the sample support is configured to removably clamp a sample for inspection in a fixed position with respect to the sample support and configured so that, in use, at least one surface of the sample is in contact with the pliable section,
   wherein the sample support comprises an outer shell that is configured such that when in use i) the outer shell completely surrounds the pliable section, and ii) the sample is entirely received within the outer shell, and
   wherein the pliable section is configured such that when in use the pliable section completely surrounds and clamps the sample such that each side of the sample is contacted by the pliable section.

2. An x-ray inspection system according to claim 1, wherein the pliable section comprises a resilient material.

3. An x-ray inspection system according to claim 1, wherein the pliable section comprises a compressible foam.

4. An x-ray inspection system according to claim 1, wherein the outer shell comprises a material having a greater rigidity than a pliable material that the pliable section is comprised of.

5. An x-ray inspection system according to claim 4, wherein the outer shell comprises carbon fibres or aramid fibres.

6. An x-ray inspection system according to claim 1, wherein the sample support comprises a first support portion and a second support portion, the first support portion being moveable relative to the second support portion between an open position in which the sample support can receive a sample and a closed position in which the sample support clamps the sample between the first support portion and the second support portion of the sample support.

7. An x-ray inspection system according to claim 1, wherein the sample support positioning assembly comprises a base and a frame attached to the base to which the sample support is connected.

8. An x-ray inspection system according to claim 7, wherein the frame is movable about a pivot fixed relative to the base.

9. An x-ray inspection system according to claim 1, further comprising an x-ray filter between the x-ray source and x-ray detector.

10. An x-ray inspection system according to claim 1, wherein the sample support positioning assembly comprises a rotational drive configured to rotate the sample support about a rotational axis.

11. An x-ray inspection system according to claim 1, further comprising a vertical positioning mechanism for moving the sample support in a vertical direction, towards or away from the x-ray source.

12. An x-ray inspection system according to claim 1, wherein the pliable section is configured such that when in use the pliable section supports each side of the sample, wherein the pliable section comprises a first pliable portion and a second pliable portion that is movable relative to the first pliable portion such that the first pliable portion and the second pliable portion are configured to clamp the sample when in use, and wherein the first pliable portion and the second pliable portion are comprised of the same pliable material.

13. An x-ray imaging accessory for an x-ray inspection system comprising:
   a sample support comprising a pliable section; and
   a sample support positioning assembly comprising a rotational drive configured to rotate the sample support about a rotational axis;
   wherein the sample support is configured to removably clamp a sample for inspection in a fixed position with respect to the sample support and configured so that, in use, at least one surface of the sample is in contact with the pliable section,
   wherein the sample support comprises an outer shell that is configured such that when in use i) the outer shell completely surrounds the pliable section, and ii) the sample is entirely received within the outer shell, and
   wherein the pliable section is configured such that when in use the pliable section completely surrounds and clamps the sample such that each side of the sample is contacted by the pliable section.

14. An x-ray imaging accessory assembly according to claim 13, wherein the pliable section is comprised of a resilient material such as a compressible foam.

15. An x-ray imaging accessory according to claim 13, wherein the sample support comprises an outer shell comprising a material having a greater rigidity than the pliable section such as carbon fibres, aramid fibres, PEEK or a low density metal such as aluminium.

16. A sample support for an x-ray inspection system, the sample support comprising:
   a pliable section; and
   a mechanical interface for connection with a rotational drive;
   wherein the sample support is configured to removably clamp a sample for inspection in a fixed position with respect to the sample support and configured so that, in use, at least one surface of the sample is in contact with the pliable section,
   wherein the sample support comprises an outer shell that is configured such that when in use i) the outer shell completely surrounds the pliable section, and ii) the sample is entirely received within the outer shell, and
   wherein the pliable section is configured such that when in use the pliable section completely surrounds and clamps the sample such that each side of the sample is contacted by the pliable section.

17. A kit for an x-ray inspection system comprising a plurality of samples supports, each sample support according to claim 16;
   wherein each of the plurality of sample supports has a different diameter.

18. A method of using an x-ray inspection system comprising an x-ray source, an x-ray detector and a sample support comprising a pliable section and an outer shell, the method comprising:
   clamping a sample to be inspected in the sample support such that the sample is in a fixed position with respect to the sample support and each surface of the sample is in contact with the pliable section, wherein i) the outer shell completely surrounds the pliable section, ii) the sample is entirely received within the outer shell, and iii) the pliable section completely surrounds and clamps the pliable section such that each side of the sample is contacted by the pliable section;
   positioning the sample support between the x-ray source and the x-ray detector;
   recording an x-ray image of the sample;
   rotating the sample support with respect to the x-ray source; and
   recording a second x-ray image of the sample.

19. The method according to claim 18, wherein the sample support comprises a first support portion and a second support portion, the first support portion being moveable relative to the second support portion, and wherein the step of clamping the sample to be inspected comprises:
   moving the first support portion of sample support relative to the second support portion of sample support and into an open position;
   placing the sample in the sample support; and
   moving the first support portion of sample support relative to the second support portion of sample support and into a closed position in which the sample is clamped by the sample support.

20. The method according to claim 18, wherein the clamping the sample step comprises clamping the sample between a first pliable portion of the pliable section and a second pliable portion of the pliable section, wherein the second pliable portion moves relative to the first pliable portion to clamp the sample such that the pliable section supports each side of the sample, and wherein the first pliable portion and the second pliable portion are comprised of the same pliable material.

* * * * *